(12) United States Patent
Schulz et al.

(10) Patent No.: US 8,328,157 B2
(45) Date of Patent: Dec. 11, 2012

(54) ELECTROMAGNETIC HYDRAULIC VALVE

(75) Inventors: Jurgen Schulz, Nuremberg (DE);
Marco Meisborn, Hochstadt a.d. Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 314 days.

(21) Appl. No.: 12/763,421

(22) Filed: Apr. 20, 2010

(65) Prior Publication Data

US 2010/0276618 A1    Nov. 4, 2010

(30) Foreign Application Priority Data

Apr. 30, 2009   (DE) .................... 10 2009 019 534

(51) Int. Cl.
*F16K 31/02*    (2006.01)
(52) U.S. Cl. .................. 251/129.15; 251/129.07
(58) Field of Classification Search ........... 251/129.02, 251/129.07, 129.15, 129.19, 129.21; 303/119.2
See application file for complete search history.

(56) References Cited

U.S. PATENT DOCUMENTS

| | | | |
|---|---|---|---|
| 6,113,066 A * | 9/2000 | Hohl et al. ............... | 251/129.02 |
| 6,471,305 B1 * | 10/2002 | Leventhal et al. ......... | 303/119.2 |
| 6,994,234 B2 * | 2/2006 | de Leeuw .................... | 222/504 |
| 2006/0261301 A1 * | 11/2006 | Eiser et al. ............... | 251/129.02 |

FOREIGN PATENT DOCUMENTS

DE    102005049122    10/2006

* cited by examiner

*Primary Examiner* — Eric Keasel
*Assistant Examiner* — Reinaldo Sanchez-Medina
(74) *Attorney, Agent, or Firm* — Volpe and Koenig, P.C.

(57) ABSTRACT

An electromagnetic hydraulic valve (1) is provided having a valve housing (2) with a pressurized hydraulic medium inlet channel (24), a pressurized hydraulic medium outlet channel (25), a magnet coil (3), and a valve seat (23), with a magnet armature (9) that can be excited by the magnet coil and a valve tappet (10, 10') fixed on this armature. A valve-closing element (13) is activated by the valve tappet and that blocks the connection between the pressurized hydraulic medium channels for contact on the valve seat. The magnet armature with the valve tappet and the valve-closing element are guided so that they can move longitudinally in the valve housing and the valve tappet and the valve-closing element contact each other with facing longitudinal end sides (26, 27) in a way that is free from tensile forces. Here, one annular, continuous lobe or several lobes (28, 28') separated from each other are formed on the longitudinal end side of the valve tappet, which span a contact plane running perpendicular to a longitudinal direction of movement for the longitudinal end side of the valve-closing element.

2 Claims, 2 Drawing Sheets

ELECTROMAGNETIC HYDRAULIC VALVE

CROSS-REFERENCE TO RELATED APPLICATIONS

This application claims the benefit of German Patent Application No. 10 2009 019 534.3, filed Apr. 30, 2009, which is incorporated herein by reference as if fully set forth.

FIELD OF THE INVENTION

The invention relates to an electromagnetic hydraulic valve, which includes:
- a valve housing with a pressurized hydraulic medium inlet channel, a pressurized hydraulic medium outlet channel, a magnet coil, and a valve seat,
- a magnet armature that can be excited by the magnet coil and a valve tappet fixed on the magnet armature,
- a valve-closing element that is activated by the valve tappet and that blocks the connection between the pressurized hydraulic medium inlet channel and the pressurized hydraulic medium outlet channel when contacting the valve seat, wherein the magnet armature with the valve tappet and the valve-closing element are guided so that they can move longitudinally in the valve housing and the valve tappet and the valve-closing element contact each other with facing longitudinal end sides in a manner free from tensile forces.

BACKGROUND

A hydraulic valve of this type emerges from DE 10 2005 049 122 A1, which is considered a class-forming patent. Both the magnet armature with the valve tappet fixed on this armature and also the valve-closing element are held with play in sliding guides of the valve housing. The valve tappet and the valve-closing element contact each other free from tensile forces or contact each other loosely on the end sides simply by being pressed together, in order to transfer pressure forces and to press the valve-closing element against the valve seat in a sealing manner when the magnet armature is excited. Tests of such a hydraulic valve have shown, however, that the long-lasting sealing function of the valve-closing element is negatively affected if this is tilted relative to the longitudinal direction of motion within the limits of the guide play and contacts the valve seat only on one side with correspondingly high wear of the sealing face. In addition, in the case of the hydraulic, pressure-compensating hydraulic valve with a sealing ring enclosing the valve-closing element for this purpose, the danger arises that this sealing ring also closes prematurely due to the permanent tilting motion of the valve-closing element.

The tilting of the valve-closing element is a direct consequence of impermissibly high run-out errors of the longitudinal end side of the valve tappet, wherein this end side contacts the valve-closing element and the flat longitudinal end side of the valve-closing element attempts to align to this end side in each switching process. The necessary run-out tolerance on the valve tappet could indeed be maintained with reliable processing by 100% inspection of the run out with correspondingly high reject rate or cutting/grinding finishing work of the valve tappet. Such measures, however, are connected with significantly increased manufacturing costs.

SUMMARY

The present invention is therefore based on the objective of providing a hydraulic valve of the type named above with low manufacturing costs while changing it as little as possible, so that a largely constant and reproducible control of the pressurized hydraulic medium flow through the hydraulic valve is guaranteed over its entire service life and, in this way, in particular, for a very high number of switching cycles.

This objective is met by the device according to the invention, while advantageous refinements and constructions of the invention are described below and in the dependent claims. Consequently, on the longitudinal end side of the valve tappet, one annular, continuous lobe or several lobes separated from each other should be formed, wherein these lobes span a contact plane running perpendicular to the longitudinal direction of motion for the longitudinal end side of the valve-closing element.

The economical shaping of the longitudinal end side of the valve tappet, wherein this shaping exhibits uniform, high precision with respect to the orthogonality of the contact plane to the longitudinal direction of movement, is performed in an especially preferred way with an embossing die that holds the structural unit formed from the magnet armature and the valve tappet already fixed on this armature on the periphery of the magnet armature and that is consequently aligned in the longitudinal direction of movement and that is set with an embossing stamp running in the longitudinal direction of movement onto the longitudinal end side of the valve tappet, in order to deform the tappet material to form the lobe or lobes.

In the case of several optionally circular or elliptical lobes that are separated from each other, advantageously three lobes are provided that are offset relative to each other uniformly by 120° with respect to the longitudinal direction of movement. Compared with only one annular lobe, the construction with three lobes in addition to the exact definition of the contact plane is advantageous to the extent that, indeed, the contact pressures are higher due to the smaller contact surface, but lead to a wear-resistant material hardening of the contact partners after only a few switching cycles of the hydraulic valve. For the case that the valve tappet is constructed as a tube and not cylindrically, but instead with an essentially triangular profile, the lobes should be arranged at the vertexes of the profile. Nevertheless, two lobes or greater than three lobes could be provided as the contact between the valve-closing element and the valve tappet. Independent of the number of lobes, these could be shaped arbitrarily as long as the contact plane running perpendicular to the longitudinal direction of movement is defined.

BRIEF DESCRIPTION OF THE DRAWINGS

Additional features of the invention emerge from the following description and from the drawings in which embodiments of the invention are presented. Shown are.

DETAILED DESCRIPTION OF THE PREFERRED EMBODIMENTS

Figure 1:
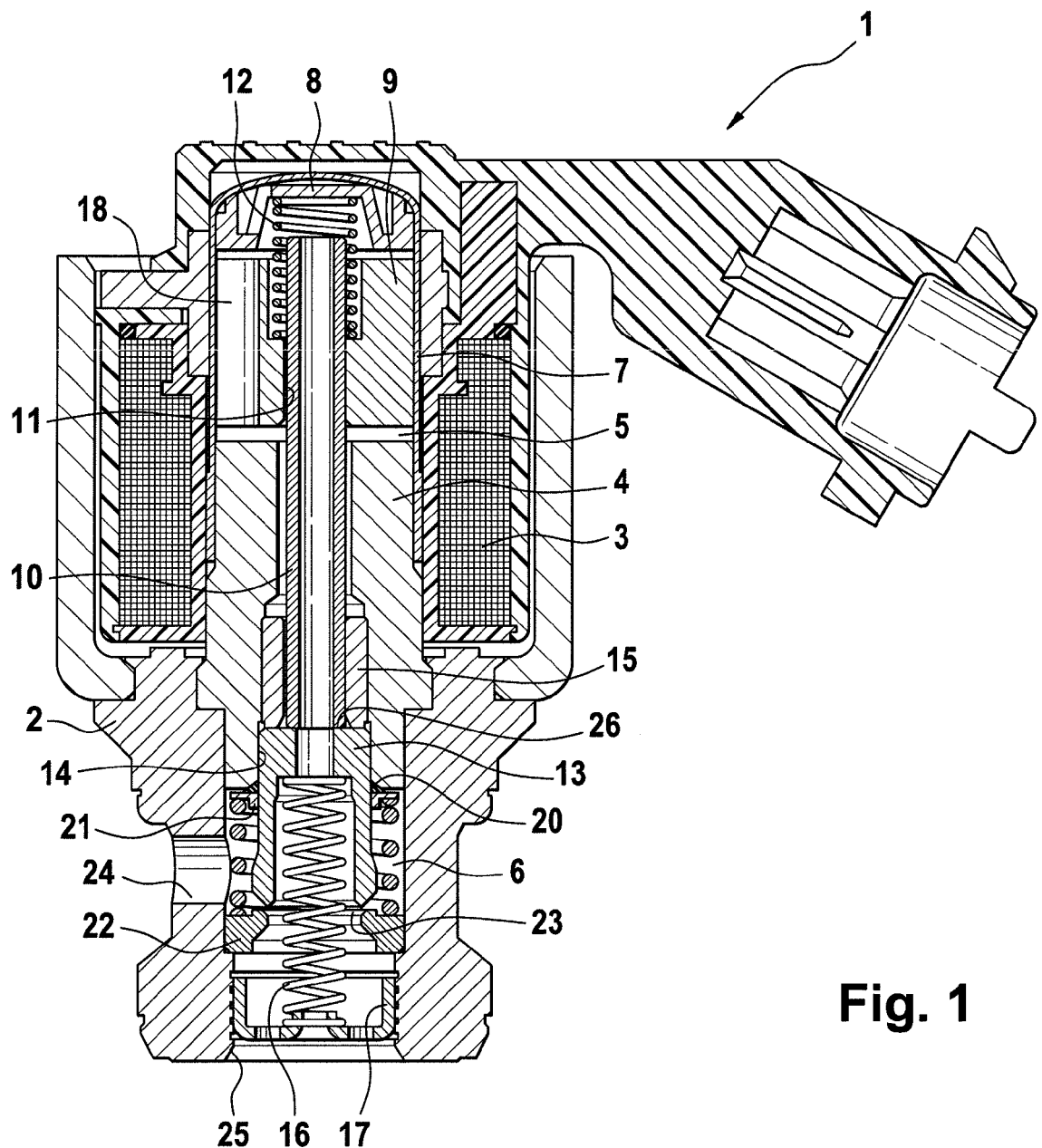
FIG. 1 is a longitudinal section view of an electromagnetic hydraulic valve according to the invention.

FIG. 1 shows an electromagnetic hydraulic valve 1 constructed as a 2/2 directional seat valve in longitudinal section.

The hydraulic valve 1 has a valve housing 2 that is configured with a cartridge construction method and that is constructed in terms of production as a turned component that is suitable for automated machines. A magnet coil 3 and a tubular magnet core 4 that is fixed in the valve housing in a fluid-tight manner by outer swaging of the valve housing 2 are inserted into the top part of the valve housing 2. An extremely thin-walled sleeve 7 that is produced in a deep-drawing method and that is closed like a pot in its end region and that holds a solid end plate 8 in the end region is set on the magnet core 4 that borders, on one side, a magnet armature space 5 and, on the other side, a pressurized hydraulic medium space 6. A magnet armature 9 guided underneath the end plate 8 so that it can move longitudinally in the sleeve 7 is connected to a tubular valve tappet 10 that is fixed by a longitudinal interference fit in a stepped borehole 11 of the magnet armature 9. A restoring spring 12 that is guided in some sections in the stepped borehole 11 for reliable orientation is located in the magnet armature space 5 between the magnet armature 9 and the end plate 8.

The structural unit consisting of the magnet armature 9 and the valve tappet 10 is used for activating a similarly tubular valve-closing element 13 whose outer lateral surface is guided just like the outer lateral surface of the valve tappet 10 so that it can move longitudinally in some sections in a central passage borehole 14 of the magnet core 4. The passage borehole 14 is here constructed as a stepped borehole with a lower, expanded section in which the valve-closing element 13 and a bushing 15 are held. The inner diameter of the bushing 15 is adapted to the outer diameter of the valve tappet for centering and guiding this valve tappet 10. In contrast, the outer diameter of the bushing 15 is adapted to the inner diameter of the passage borehole 14 in its expanded section for producing a pressed connection, for which the passage borehole 14 is provided with grooves, in order to guarantee a continuous pressing force. The pressing depth of the bushing 15 in the magnet core 4 is selected such that, in a simple way, the desired stroke can be set for the valve-closing element 13.

When the magnet armature 9 is not excited electromagnetically, the valve-closing element 13 rests in the open position on the end face of the bushing 15 under the effect of a valve spring 16. The valve spring 16 is biased and can also be adjusted accordingly by a spring stop 17 pressed from below into the opening of the valve housing 2, wherein the pressed connection for the spring stop 17 corresponds with respect to production to the already explained pressed connection for the bushing 15. The tubular shape reduced in inner diameter of the valve-closing element 13 allows a secure, compact reception and support of individual windings of the valve spring 16. The spring end facing away from the valve-closing element 13 is likewise centered by an opening on the cap-shaped spring stop 17 that is produced from thin sheet metal by deep drawing.

Figure 2:
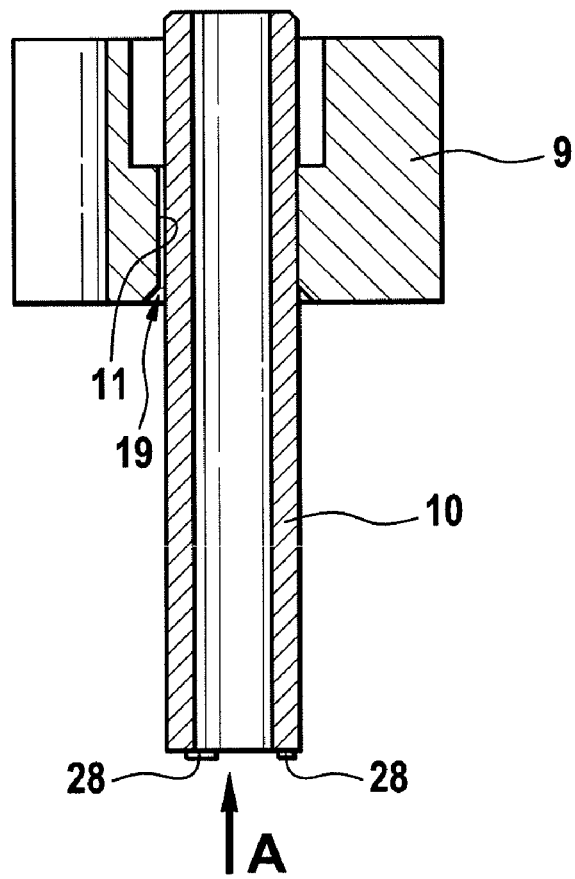
FIG. 2 is a longitudinal section view of a structural unit of the hydraulic valve consisting of a magnet armature and a valve tappet fixed on this armature.

For reducing the hydraulic resistance, the otherwise cylindrical magnet armature 9 is penetrated parallel to its longitudinal axis by four pressure compensating boreholes 18 distributed uniformly around the periphery. The pressurized hydraulic medium flowing through the pressurized hydraulic medium space 6 can thus be led unimpaired through the valve-closing element 13, the valve tappet 10, and the magnet armature 9 into the upper magnet armature space 5 and thus to the end region of the sleeve 7, so that independent of the pressure and temperature differences of the pressurized hydraulic medium, a nearly constant switching characteristic of the hydraulic valve 1 is advantageously guaranteed. The valve tappet 10 is likewise constructed as an essentially triangular profile (see end-side view A of the valve tappet 10 in FIG. 3), so that pressurized hydraulic medium can also flow through three crescent-shaped gaps 19 between the valve tappet 10 and the stepped borehole 11 (see FIG. 2).

In this connection, the hydraulic pressure compensation of the hydraulic valve 1 is of special importance. For this purpose, the valve-closing element 13 is closed on its outer lateral surface by a sealing ring 20 that is pressed by a spring-loaded spring plate 21 from below against the end face of the magnet core 4. For the closed valve switching position, the sealing ring 20 separates the magnet armature space 5 from the pressurized hydraulic medium space 6 and prevents undesired gap leakage flows through the play fit between the valve-closing element 13 and the magnet core 4 in the direction of the magnet armature space 5.

Above the spring stop 17, an annular body 22 is pressed into the valve housing 2, in order to form, for a closed valve switching position, a valve seat 23 interacting with the valve closing element 13 in a sealing manner in the form of a conical seal seat. At the height of the valve-closing element 13 and thus above the valve seat 23, the valve housing 2 has a pressurized hydraulic medium inlet channel 24 that is connected, in the open valve switching position according to the figure, to a pressurized hydraulic medium outlet channel 25 opening from below vertically into the valve housing 2 via the pressurized hydraulic medium space 6.

As explained above, the valve-closing element 13 and the valve tappet 10 contact each other loosely on the ends, so that when the magnet armature 9 is excited electromagnetically, the valve-closing element 13 activated by the valve tappet 10 is oriented with its flat longitudinal end side 26 on the longitudinal end side 27 of the valve tappet 10 contacting this flat longitudinal end side (see FIG. 3), as far as permitted by the guide play of the valve-closing element 13 compared with the magnet core 4. Tilting of the valve-closing element 13 generated in this way relative to its longitudinal direction of movement with corresponding, one-sided slanted placement on the valve seat 23 is eliminated according to the invention or at least kept negligibly small, in that several lobes 28 that are separated from each other are formed on the longitudinal end side 27 of the valve tappet 10, wherein these lobes span a contact plane running for the most part exactly perpendicular to the longitudinal axis of the magnet armature 9 and consequently to the longitudinal direction of movement of the magnet armature 9 and valve tappet 10 for the longitudinal end side 26 of the valve-closing element 13. Thus, the magnet armature 9 with the valve tappet 10, the valve-closing element 13 oriented to the contact plane, and the valve seat 23 are oriented sufficiently in the coaxial direction relative to each other and premature wear of the valve seat 23 as well as the sealing ring 20 due to the tilting of the valve-closing element 13 explained above is effectively prevented.

Figure 3:
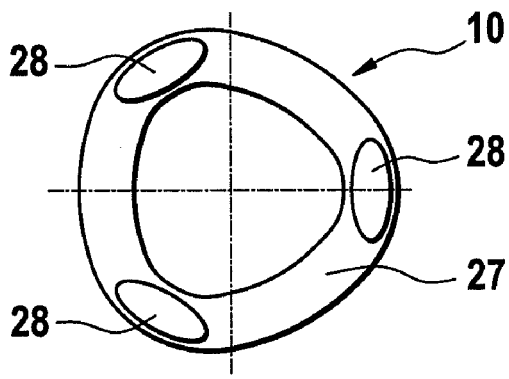
FIG. 3 is the view A according to FIG. 2 of the valve tappet.

As becomes clear from FIG. 3, three identical, elliptical lobes 28 are provided that are generated by cold forming and the present embossing of the longitudinal end side 27 and that are arranged with respect to the longitudinal direction of movement uniformly offset by 120° relative to each other at the profile vertexes of the triangular valve tappet 10. In comparison to the total surface area of the longitudinal end side 27, its available contact surface area on the lobes 28 is small, so that, in the initial runs of the valve switching processes, the high contact pressures lead to wear-resistant material hardening of the lobes 28.

Figure 4:
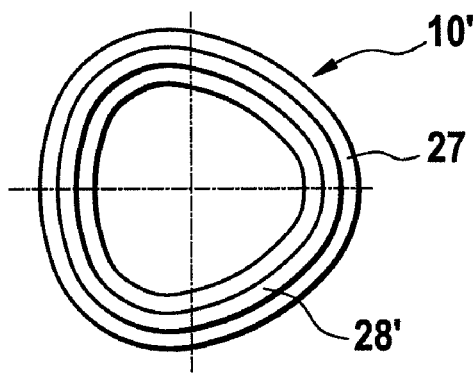
FIG. 4 is the view A according to FIG. 2 of an alternative valve tappet.

From FIG. 4, an alternative construction is taken. This differs merely in that a single, annular, continuous lobe 28' is provided that is likewise formed by a correspondingly modified embossing stamp on the longitudinal end side 27 of the valve tappet 10'.

REFERENCE NUMBERS

1 Hydraulic valve
2 Valve housing
3 Magnet coil
4 Magnet core
5 Magnet armature space
6 Pressurized hydraulic medium space
7 Sleeve
8 End plate
9 Magnet armature
10 Valve tappet
11 Stepped borehole of the magnet armature
12 Restoring spring
13 Valve-closing element
14 Passage borehole of the magnet core
15 Bushing
16 Valve spring
17 Spring stop
18 Pressure compensating borehole
19 Gap
20 Sealing ring
21 Spring plate
22 Ring body
23 Valve seat
24 Pressurized hydraulic medium inlet channel
25 Pressurized hydraulic medium outlet channel
26 Longitudinal end side of the valve-closing element
27 Longitudinal end side of the valve tappet
28 Lobe

The invention claimed is:

1. Electromagnetic hydraulic valve, comprising: a valve housing with a pressurized hydraulic medium inlet channel, a pressurized hydraulic medium outlet channel, a magnet coil, and a valve seat, a magnet armature that can be excited by the magnet coil and a valve tappet fixed on the magnet armature, a valve-closing element that is activated by the valve tappet and that blocks a connection between the pressurized hydraulic medium inlet channel and the pressurized hydraulic medium outlet channel by contact on the valve seat, the magnet armature with the valve tappet and the valve-closing element are guided so that they can move longitudinally in the valve housing and the valve tappet and the valve-closing element contact each other with facing longitudinal end sides in a manner that is free from tensile forces, and a plurality lobes that are separated from each other are formed on the longitudinal end side of the valve tappet, the plurality of lobes span a contact plane running perpendicular to a longitudinal direction of movement for the longitudinal end side of the valve-closing element and the plurality of lobes comprise three lobes that are offset uniformly by 120° relative to each other with respect to the longitudinal direction of movement.

2. Hydraulic valve according to claim 1, wherein the valve tappet is constructed as a tube with an essentially triangular profile, and the lobes are arranged at the profile vertexes.

* * * * *